United States Patent Office 3,684,617
Patented Aug. 15, 1972

3,684,617

CURABLE EPOXY RESIN/ACRYLIC RESIN MIXTURES

Leo J. Windecker, 1605 Midkiff, Midland, Tex. 79701

No Drawing. Filed Mar. 11, 1970, Ser. No. 18,767
Int. Cl. C09j *3/16*
U.S. Cl. 156—330 5 Claims

ABSTRACT OF THE DISCLOSURE

A curable mixture of epoxy or vinyl ester resin and acrylic resin is used as an adhesive between an epoxy or vinyl ester resin and an acrylic resin or as a metal coating.

This invention relates to the bonding of epoxy or vinyl ester resins to acrylic resins by using a curable mixture of epoxy or vinyl ester resin and acrylic resin as an adhesive layer and also to coating of metals.

Various attempts have been made to effect strong bonding between epoxy or vinyl ester resins and acrylic resins. Whereas some bonding is usually obtained initially when one is cured in contact with the other, such bonding often is not dependable and is of relatively short duration. Bonding of acrylic resins to epoxy resins is described in U.S. Letters Patent 3,156,580 and also in a paper entitled, "Experience-Proven Epoxy-Acrylic Finish System," by Robert F. Howard, Tech. Proc. Am. Electroplater's Soc., 48, 47–51 (1961).

It would be beneficial if there were available an improved means of bonding acrylic resins and epoxy or vinyl ester resins.

It would also be desirable if such means were simple and provided good adhesion between the acrylic resin and epoxy or vinyl ester resin for extended periods of time.

These benefits and other advantages in accordance with the present invention are achieved in a process for bonding epoxy or vinyl ester resins to acrylic resins by applying an adhesive layer between the two, said adhesive comprising a curable mixture of acrylic resin precursor and epoxy or vinyl ester resin. The proportion of acrylic resin precursor to epoxy or vinyl ester resin in the mixture is generally in the range of from about 30:70 to about 70:30 by weight. Preferably, the ratio of acrylic resin precursor to epoxy or vinyl ester resin in the mixture is in the range of about 60:40 to 40:60.

The curable mixture of acrylic resin precursor and epoxy or vinyl ester resin comprises an acrylic resin precursor (e.g. monomers or prepolymers) along with a suitable polymerization catalyst or initiator, and a curable epoxy or vinyl ester resin along with a suitable curing agent.

Acrylic resins (and catalysts therefor) considered to be within the scope of this invention are shown, e.g., in "Acrylic Resins," by Milton B. Horn, Reinhold Plastics Applications Series, Reinhold Publishing Corporation, 1960.

Epoxy resins (and curing agents therefor) considered to be within the scope of this invention are shown, e.g. in "Epoxy Resins," by Henry Lee and Kris Neville, McGraw-Hill Book Company, Inc., 1957.

Of particular interest is an embodiment of this invention wherein the uncured epoxy resin is reacted with an olefinically unsaturated monocarboxylic acid to form a vinyl ester resin. The vinyl ester resin is then admixed with an acrylic resin precursor (such as described hereinbefore), along with a suitable curing agent, and employed as a curable adhesive for bonding a cured acrylic resin to a cured epoxy resin or vinyl ester resin. The vinyl ester resin adhesive is found to withstand repeated temperature cyclings of from −70° F. to 170° F. and is found to be ideally suitable for use in bonding polymethylmethacrylate windows or canopies to epoxy or vinyl ester resin structures reinforced with glass fibers, e.g. in aircraft.

The term "vinyl ester resin" as used herein refers to unsaturated, polymerizable resins which are prepared by reacting about equivalent quantities of an unsaturated monocarboxylic acid with an epoxy resin. For example, with methacrylic acid and diglycidyl ether of bisphenol A, the vinyl ester has the formula

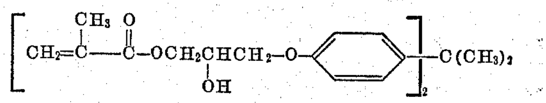

The preparations of such vinyl ester resins are described in several patents including, e.g. U.S. 3,066,112; U.S. 3,179,623; U.S. 3,256,226, U.S. 3,301,743, and U.S. 3,377,406.

The vinyl ester resins are "cured" by admixing therewith a free radical polymerization catalyst, such as azo compounds, organic peroxides and persulfates. The catalysts cause polymerization and the polymerization normally creates an exotherm which serves to accelerate the "curing" (thermosetting) of the resin. Such resin catalyst systems can also include accelerators or promoters, e.g., naphthenates. Specific examples are benzoyl, lauroyl, or methylethylketone peroxides as catalysts. Cobalt naphthenate or N,N-dimethyl aniline, for example, are useful as accelerators.

A novel feature of the vinyl ester resins is that other polymerizable olefinically unsaturated monomers, e.g. styrene, acrylates, methacrylates, substituted styrenes, etc. can be copolymerized with the unsaturated vinyl ester resin.

In practicing the invention, the curable adhesive mixture of acrylic and epoxy or vinyl ester resins is used in the uncured or partially cured condition. The mixture ingredients may be fluid and capable of being intimately mixed or a solvent for one or more of the ingredients may be required, depending on the choice of ingredients. It is preferable that the epoxy or vinyl ester resin be mixed with its curing agent and the acrylic resin precursor be mixed with its catalyst prior to combining the two systems into a mixture. The adhesive mixture is cured after it is placed in contact with the epoxy or vinyl ester resin and/or the acrylic resin. Preferably, the uncured adhesive is brought into contact with both the acrylic resin and the epoxy resin and then cured.

In order to determine the suitability of the candidate epoxy or vinyl ester resin composition and acrylic resin composition for mixing and for use in the present invention as an adhesive, one part by weight of the epoxy or vinyl ester resin composition is mixed with one part by weight of the acrylic resin precursor and the mixture is exposed to suitable curing conditions. If the resultant composition forms a hardened (cured) continuous film, the components are compatible and excellent bonding will occur when such mixture is employed as an adhesive or bonding layer in the practice of the instant invention.

The curable mixture of epoxy or vinyl ester resin and acrylic resin described herein is useful as an adhesive or bonding layer between cured or uncured epoxy or vinyl ester resins and cured or uncured acrylics, and is most advantageously useful to obtain a good bond between a cured acrylic resin and a curing epoxy or vinyl ester resin.

Throughout this application, the terms "curable epoxy," "curable vinyl ester" and "curable acrylic" are used to indicate that the resins contain curing agents or catalysts and are capable of reacting to a final state of crosslinking or polymerization. The terms "curing epoxy," "curing vinyl ester," and "curing acrylic" indicate that the reaction between the resin and its catalyst is in progress. The terms "cured epoxy," "cured vinyl ester" or "cured acrylic" indicate that the reaction between the resin and its catalyst is apparently complete and the resin has substantialy reached its final state of crosslinking or polymerization.

Commercially available epoxies which are found to be useful in the instant invention are, e.g., Conver epoxy (Spec. FM5 00038), Alpon epoxy (off-white) and Brolite (off-white) catalyzed epoxy primer, and D.E.R.® 331 (epoxy resin from The Dow Chemical Co.).

Acrylic resins which are found to be useful in the instant invention are, e.g., copolymers of methylmethacrylate and other acrylic esters, pure acrylic resin, commercially available Lucite®, copolymers of acrylates and vinyls, and copolymers of acrylic or methacrylic acid with other unsaturated monomers. Aqueous dispersions of such acrylics should be avoided as water tends to interfere with the curing and would need to be removed prior to use in the instant invention.

EXAMPLE 1

The following are combinations used in accordance with the present invention:

(A)

(1) "Brolite" epoxy with commercially available acrylic lacquer (Mill. Spec. MIL–L–19537);
(2) "Brolite" epoxy with a nitro cellulose acrylic resin;

(B)

(1) "Alpon" epoxy with acrylic lacquer (Mil. Spec. MIL–L–19537);
(2) "Alpon" epoxy with polymethylmethacrylate;

(C)

(1) "Conver Prime" epoxy with acrylic lacquer (Mil. Spec. MIL–L–19537); and
(2) "Conver Prime" epoxy with commercially available "Lucite" acrylic resin.

The hereinbefore delineated combinations are treated in the following manner: the epoxy resin is cured to form a panel about ⅛ inch in thickness and allowed to stand at room temperature for 5 days. A 1:1 mixture of the epoxy component with the acrylic component is applied to one surface of the panel to provide a dry coating about 4 mils in thickness. The mixed coating is dried for 2 days at room temperature. The acrylic component is then coated on to provide a coating about 8 mils in thickness and subsequently cured for 2 days at room temperature. All samples are examined for adhesion of the acrylic coating to the epoxy coating and are firmly bonded. Similar beneficial results are achieved when the proportions of epoxy resin and acrylic resin are varied between 30:70 and 70:30.

For purposes of comparison, when the foregoing experiment is repeated with the exception that the mixed epoxy coating is omitted, very poor adhesion is obtained.

EXAMPLE 2

The invention is further illustrated by first curing a sheet of polymethylmethacrylate, then applying onto the cured acrylic a 50/50 curable mixture of D.E.R. 331 (a diglycidyl ether of bisphenol A) and polymethylmethacrylate prepolymer, the epoxy resin containing ethylenediamine as a curing agent and the acrylate prepolymer containing benzoyl peroxide as a catalyst. The curable mixture is cured, being accelerated by the addition of a small amount of heat (not sufficient heat to melt or plastify the cured polymethylmethacrylate). A layer of curing epoxy resin is added onto the cured adhesive mixture and the epoxy cure is brought to completion. The resulting laminate structure is well bonded and exhibits no tendency to delaminate.

EXAMPLE 3

Alternately, the above illustration is repeated except that the curable mixture is brought to a gel state (partial cure) before the curing epoxy layer is added, and the curable adhesive mixture and the curing epoxy layer are then both brought to a complete cure.

EXAMPLE 4

A curable acrylic lacquer is sprayed onto the forming surface of a mold and allowed to dry. A 50/50 mixture of the acrylic lacquer and curable epoxy resin (containing amine curing agents) is applied to the dried acrylic surface and allowed to partially cure. A "wet cloth" consisting of woven fiber glass saturated with a curable epoxy resin is placed on the surface of the partially cured adhesive mixture. The so-formed laminate is brought to a final state of cure, said cure being accelerated by the addition of heat. After several days of aging the laminate is cut into several pieces. One piece is immersed in water, another subjected to 100% relative humidity, and another is exposed to outside weather. After more than two years of such exposure, each test sample is found to be in excellent condition and no tendency toward delamination is found.

EXAMPLE 5

The above experiment is repeated except that the acrylic lacquer layer along with the adhesive layer is brought to a complete cure and aged for several days prior to the addition of the "wet cloth." The "wet cloth" is then brought to a final cure, the laminate cut into several pieces and subjected to the same tests as shown in the preceding example. After more than two years of such exposure, each test sample is found to be in excellent condition and no tendency to delaminate is found.

EXAMPLE 6

To illustrate the efficacy of a curable mixture of epoxy resin and acrylic resin as a primer coat or finish coat for aluminum, a 50/50 mixture of curable epoxy resin and curable acrylic prepolymer is coated onto a cleaned aluminum sheet and then cured. After an extended period of time, the coated surface of the aluminum is found to have resisted oxidation and is found to be superior to treatment of the aluminum with zinc chromate. The cured mixture also exhibits excellent bonding to the aluminum.

In like manner to the above, other metals such as magnesium, iron, copper, and steel are protected by the use of a curable epoxy/curable acrylic mixture as a primer or finish coat. The curable mixture serves as a primer to which a curable epoxy or a curable acrylic is coated, whether or not the curable mixture is brought to a final state of cure prior to being coated with the curable resin topcoat.

EXAMPLE 7

The following mixture is used as an adhesive for glazing a Plexiglas® canopy onto a portion of an aircraft fuselage comprised principally of a cured epoxy resin reinforced with glass fibers.

| | Parts |
|---|---|
| Methyl methacrylate | 30 |
| Styrene | 31 |
| Vinyl ester resin (prepared by reacting methacrylic acid with diglycidyl ether of bisphenol A) | 39 |
| Cobalt naphthenate | 0.5 |
| Methyl ethyl ketone peroxide | 0.75 |

The adhesive is cured in place and a strong durable bond is obtained which withstands repeated temperature cyclings over the range of −70° F. to +170° F.

In the above illustrations of the invention, successful bonding is achieved by the use of curable adhesive mixtures of epoxy or vinyl ester resin and acrylic resin precursor wherein the ratio of epoxy or vinyl ester/acrylic is in the range of about 70:30 to 30:70, and most effectively in the range of about 60:40 to about 40:60.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention.

What is claimed is:

1. A process for bonding a surface of a cured epoxy resin or cured vinyl ester resin to a surface of a cured acrylate or methacrylate ester resin, said process comprising (a) applying to the surfaces to be bonded a curable adhesive mixture of an epoxy resin or vinyl ester resin containing a curing agent therefor and an acrylate or methacrylate ester monomer or prepolymer containing a curing agent therefor, said mixture having a ratio of epoxy resin or vinyl ester resin/acrylate or methacrylate ester monomer or prepolymer in the range of from about 70:30 to about 30:70, and (b) effecting a cure of the curable adhesive mixture.

2. The process of claim 1 wherein the curable adhesive mixture comprises epoxy resin or vinyl ester resin/acrylate or methacrylate ester monomer or prepolymer in a ratio of from about 60:40 to about 40:60.

3. The process of claim 1 wherein the curable adhesive mixture comprises epoxy resin and acrylate or methacrylate ester monomer or prepolymer.

4. The process of claim 1 wherein the curable adhesive mixture comprises vinyl ester resin and acrylate or methacrylate ester monomer or prepolymer.

5. The process of claim 1 wherein the cured epoxy resin surface is a portion of an airplane fuselage, the cured methacrylate ester resin surface is polyymethylmethacrylate, and the curable adhesive mixture comprises a vinyl ester resin containing a curing agent therefor and methyl methacrylate containing a peroxide curing agent therefor, said vinyl ester resin having the formula

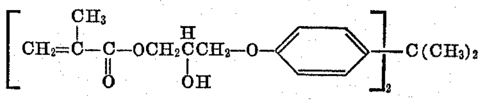

References Cited

UNITED STATES PATENTS

| | | | |
|---|---|---|---|
| 3,377,406 | 4/1968 | Newey et al. | 260—837 |
| 3,420,914 | 1/1969 | May | 260—837 |
| 3,340,137 | 9/1967 | Kamal | 161—184 |
| 3,405,025 | 10/1968 | Goldman | 161—4 |
| 3,156,580 | 11/1964 | Howard | 117—75 |
| 3,373,075 | 3/1968 | Fekete et al. | 161—185 |
| 3,418,295 | 12/1968 | Schoenthaler | 260—80.72 |
| 3,479,246 | 11/1969 | Stapleton | 161—218 |
| 3,508,951 | 4/1970 | Shimp et al. | 117—72 |
| 3,547,766 | 12/1970 | Chu | 161—190 |

CARL D. QUARFORTH, Primary Examiner

E. A. MILLER, Assistant Examiner

U.S. Cl. X.R.

156—108, 332; 161—184